March 20, 1951 — O. G. ERICKSON ET AL — 2,545,946
INTERNAL-COMBUSTION ENGINE
Filed Aug. 2, 1946
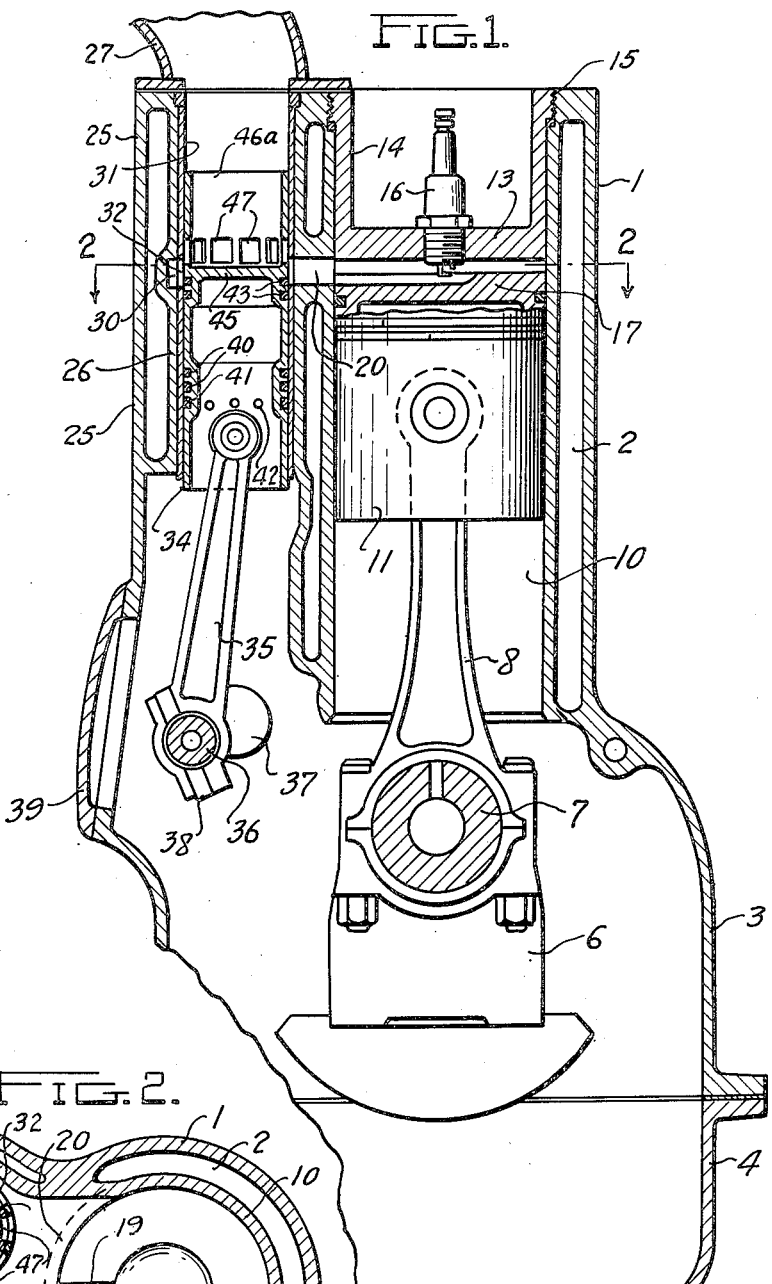
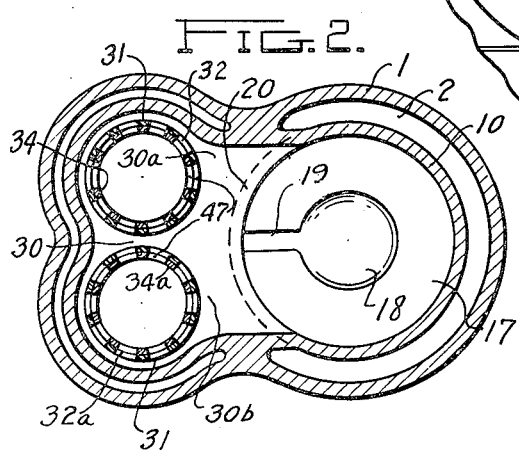
INVENTOR.
Oscar G. Erickson
Charles L. Erickson
BY
Barnes, Kisselle, Laughlin & Raisch
ATTORNEYS Patented Mar. 20, 1951

2,545,946

UNITED STATES PATENT OFFICE 2,545,946

INTERNAL-COMBUSTION ENGINE

Oscar G. Erickson, Detroit, and Charles L. Erickson, Ferndale, Mich.

Application August 2, 1946, Serial No. 688,116

1 Claim. (Cl. 123—188)

1

This invention relates to internal combustion engines and it has to do particularly with an engine which embodies a piston valve.

More particularly, the invention is directed to improvements in a piston type of valve so arranged and constructed that the wearing faces of the piston and the cylinder formation therefor are maintained lubricated. The construction further provides for the employment of suitable rings on the piston valve in conjunction with a ported sleeve or cylinder so that the rings can move past the ports. A further object is the provision of a valve construction and passageway means for the gases in conjunction with an engine construction which provides for turbulence in the incoming gaseous fuel. To this end, the power piston of the engine is so constructed as to facilitate the turbulence incident to the firing or explosion of the charge.

A still further object of the invention is the provision of means for operating the piston valve and an engine block construction so that access may be had to this means for assembly and disassembly operations.

An engine structure constructed in accordance with the invention is disclosed in the accompanying drawings wherein:

Fig. 1 is a cross sectional view through the engine illustrating the crank and piston thereof and showing the piston valve structure.

Fig. 2 is a cross sectional view taken substantially on line 2—2 of Fig. 1.

In the drawings, an engine block is illustrated at 1 provided with a cooling jacket structure 2 for a suitable coolant. The crank case is illustrated at 3 while the so-called pan is at 4. A crank of the engine is illustrated at 6 having a crank throw 7 upon which is mounted a connecting rod 8. It will be appreciated that only one cylinder and one valve is shown but that any engine constructed in accordance with the invention may have cylinders in any desired number.

The engine cylinder is illustrated at 10 operating in which is a piston 11 and which is connected to the rod 8. The cylinder head 13 is of recessed construction having a side wall 14 for fitting into the cylinder so that the head 13 is lowered in the cylinder. This head may be located as by means of screw threads as shown at 15. The head 13 is arranged to carry a spark plug 16 in engines which employ such an ignition system.

The head of the piston 11, as illustrated at 17, is provided on its upper surface with a recess 18

2 which may be in alignment with the spark plug and leading from this recess is an open channel 19. The engine block is provided with a passageway 20 for the inlet and outlet of fuel and exhaust gases, the open channel 19 extending toward and communicating into the passage 20.

Formed in the engine block is an enlargement 25 which extends from and communicates with the passage 20. In the enlargement are cylinder formations, one such cylinder formation being illustrated at 26, and leading to each cylinder formation is a conduit or manifold as shown at 27. In the case of an inlet valve the manifold 27 is for fuel and in the case of exhaust the manifold 27 is for exhaust gases.

The enlargement 25 is provided with an internal passage 30 which, as shown in Fig. 2, extends around the cylinder formations and which connects to the passage 20 through passages 30a and 30b.

In each cylinder formation 26 is disposed a sleeve 31 which is provided with a circumferential series of ports 32 in alignment with the passage 30. This sleeve may be held in position as by means of being located under the manifold as shown in Fig. 1. Operating within the sleeve 31 is a piston type valve generally illustrated at 34. This piston valve is operated by connecting rod 35 which is connected to a throw 36 of a countershaft 37, the connection being by means of a cap 38. The engine block is preferably provided with access apertures covered by caps 39 to provide easy access to the throws 36 thus facilitating assembly, disassembly, and repair work.

The piston type valve is relatively elongated as illustrated in Fig. 1, its lower end being connected to the connecting rod 35 and at a location positioned somewhat above its lower end, it is provided with suitable compression rings 40 for wiping the walls of the sleeve 31. Preferably, also, the piston valve is provided with an oil ring 41 situated in a groove provided with oil ports 42. In its intermediate portion, the piston valve is provided with a head 45. Substantially at the location of the head the metal of the piston valve is formed of thickened fashion to receive compression rings 43. It will be noted that two compression rings 43 are shown; two compression rings 40 are shown and one oil ring 41 is shown. The cylindrical portion of the piston extends upwardly above the head as shown at 46a and this portion has a series of circumferentially arranged ports 47 therein. These ports are preferably located immediately adjacent the upper surface of the head 45.

In the operation of the piston type of valve, it is reciprocated in the sleeve 31. In the lower portion of its stroke the ports 47 register with the ports 32 of the sleeve. In the upper portion of its stroke the valve is elevated and the ports 47 are out of registry of the ports 32 of the sleeve. Assuming that the piston valve, as shown in Fig. 1, is on its upstroke the ports 47 are about to move out of registry with the ports 32 and the compression rings 43 are about to move past the ports 32 in the sleeve. This is permissible because the intervening struts in the sleeve accommodate the piston rings in the action. On the downstroke, the rings 43 move downwardly past the ports 32 and the ports 47 in the piston register with the ports 32 of the sleeve. The upwardly extending portion of the piston valve preferably extends far enough upwardly into the sleeve so that at no time is the surface of the sleeve 31, upon which the compression rings 43 function, uncovered by the piston valve. In other words, the lowermost position of the upper edge of the piston valve is as high or higher than the uppermost position of the compression rings 43. Accordingly, an operating film of oil may be maintained on the interior surface of the sleeve 31 which is wiped by the compression rings.

In the operation of the engine, it will be appreciated how the engine piston and the piston valve operate in proper timed manner. During the intake stroke, the piston 11 of the engine is moving downwardly to draw in fuel and this fuel moves in through the manifold 27 and the valve moves down until the ports 47 register with ports 32 so that fuel is drawn in through these aligned ports. The fuel flows through the passage 30, the portion 30a thereof, and the portion 30b and in through the pasage 20 to the cylinder. On the compression stroke of the engine piston the valve moves upwardly to close the ports 32 for compression purposes. The ports 32 are maintained closed during the power stroke and the succeeding upstroke of the engine piston is the exhaust stroke. In this portion of the cycle of movement, the corresponding exhaust valve which is otherwise constructed like the valve shown in Fig. 1 has moved downwardly so that the ports 32a in the exhaust sleeve are opened by ports in the piston 34a (Fig. 2).

The arrangement promotes turbulence in the incoming fuel to thereby facilitate and improve the fuel mixture and its burning qualities. The engine may be constructed to provide a high compression ratio in that the head 17 of the piston comes relatively close to the head 13 at the top of the piston stroke. When the mixture is fired, an explosion occurs through the channel 19 which communicates directly through the passage 20 into the portion 30b. This causes turbulene and movement of the gases about the fuel cylinder and, specifically, in portions 30b, 30a and 30. The cap 38 for the connecting rod 35 is preferably disposed at a substantial angle relative to the center line of the connecting rod so that the cap may be easily assembled or disassembled through the hand hole covered by the cap 39.

We claim:

In an internal combustion engine having a cylinder and a piston arranged to reciprocate in the cylinder, a valve cylinder positioned adjacent the engine cylinder, said valve cylinder being arranged to provide a chamber intermediate its ends and the engine having a passage leading from the chamber to the upper part of the engine cylinder, a liner sleeve positioned in the valve cylinder having ports therein which register with the chamber, manifold means for gas connecting into one end of the sleeve, a piston type valve positioned within the liner sleeve, means for reciprocating the same, said piston type valve having an intermediate head with skirts extending axially in opposite directions therefrom, the skirt on the manifold side of the head having ports therein arranged to be brought into and out of registry with the ports in the liner sleeve, said ports in the valve being located in immediate proximity to the head, rings on the piston valve positioned adjacent the head, other rings in the skirt of the piston valve which is positioned on the side of the head opposite the ports therein, the skirt on the manifold side of the head having such an axial extent that when the valve is in a position where the said ports in the valve and the said ports in the sleeve are in registry, the said skirt covers those surfaces of the sleeve between the ports of the sleeve and the said manifold means which are wiped during reciprocation of the piston valves by the rings adjacent the head of the piston valve.

OSCAR G. ERICKSON.
CHARLES L. ERICKSON.

REFERENCES CITED

The following references are of record in the file of this patent:

UNITED STATES PATENTS

| Number | Name | Date |
|---|---|---|
| 1,400,889 | Lucke | Dec. 20, 1921 |
| 1,461,494 | Nelson | July 10, 1923 |
| 1,640,958 | Nelson et al. | Aug. 30, 1927 |
| 1,897,234 | Bullington | Feb. 14, 1933 |
| 1,928,597 | Moore | Sept. 26, 1933 |
| 2,206,322 | Huesby | July 2, 1940 |